March 27, 1951 R. F. MALLINA 2,546,829

MAGNETIC RECORDER AND REPRODUCER

Filed Dec. 18, 1948

INVENTOR
R. F. MALLINA
BY
ATTORNEY

Patented Mar. 27, 1951 2,546,829

UNITED STATES PATENT OFFICE 2,546,829

MAGNETIC RECORDER AND REPRODUCER

Rudolph F. Mallina, Hastings on Hudson, N. Y., assignor to Bell Telephone Laboratories, Incorporated, New York, N. Y., a corporation of New York Application December 18, 1948, Serial No. 66,090

7 Claims. (Cl. 177—380)

Figure 1:
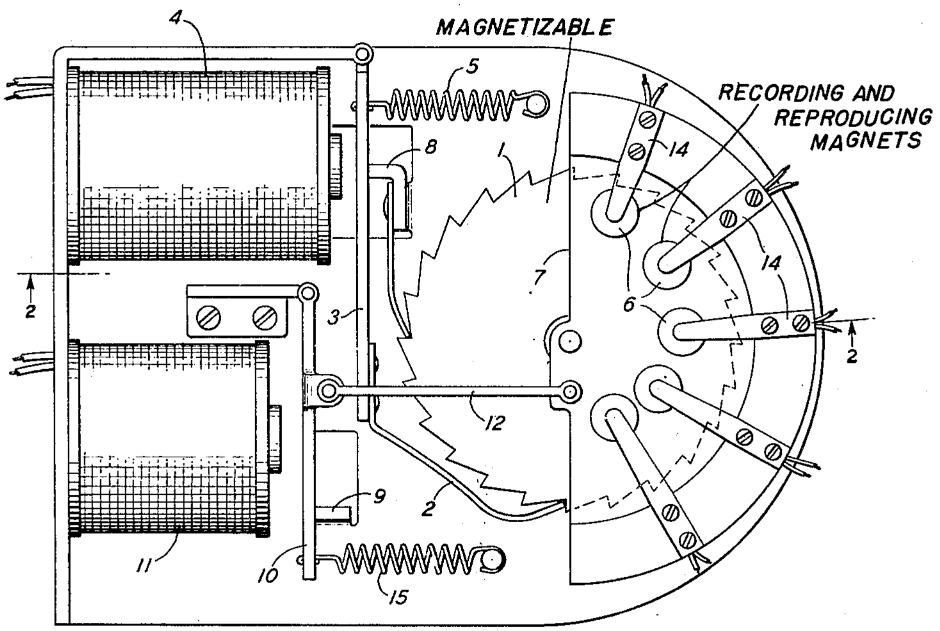

This invention relates to magnetic recorders and reproducers.

While magnetic recording has been used mostly for the recording of sounds, such as voice or music, it is also useful for recording intelligence of any kind in codes which may be formed by the placement of discrete magnetic signals on a magnetic medium. When magnetic recording is used in this way, the signals may be recorded merely by energizing the recording magnet with direct current while the magnetic medium is stationary, and the magnetic medium moved between the recordings. This produces a series of small magnetized spots on the medium and by suitable placement of these spots, codes representing the intelligence to be recorded may be formed. The same magnet that recorded the signals may be used to reproduce them but, for reproduction, the recorded signals must be traversed past the poles of the magnet with some velocity to induce detectable voltages in the windings of the magnet.

The present invention discloses a novel magnetic recorder and reproducer of simple and inexpensive construction for recording intelligence in code by spaced magnetic signals and for reproducing said signals.

A feature of the invention is that the same mechanism which advances the medium for recording the signals also traverses the recorded signals past the poles of the recording magnet when the signals are to be reproduced.

Another feature of the invention is that the recording medium itself forms part of the mechanism for advancing said medium.

Figure 2:
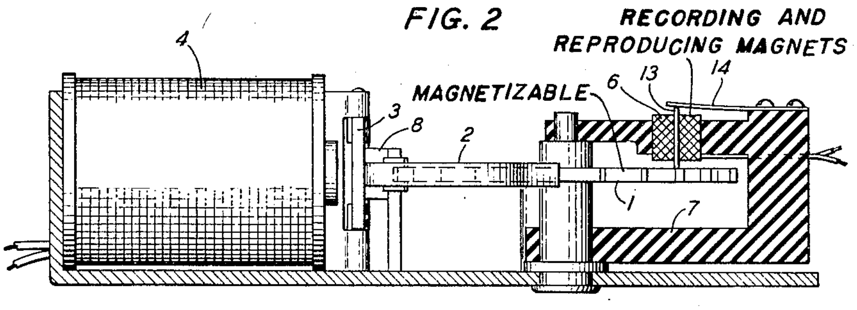

The features of the invention, its construction, and its operation will be apparent from the accompanying description, the appended claims, and the drawing in which:

Fig. 1 shows a front view of one embodiment of my magnetic recorder and reproducer, and Fig. 2 shows a sectional view of said recorder and reproducer.

As shown in the drawing, the magnetic medium 1 upon which the signals are recorded is a disc of magnetic material, or a disc having a magnetizable surface, suitably supported so that it may be rotated in its own plane. Ratchet teeth are cut in the periphery of the disc 1 and are engaged by a spring pawl 2 carried by the armature 3 of the magnet 4. The spring 5 holds the armature 3 in its normal position against the stop 8. Recording and reproducing magnets 6 are mounted on the sector 7 which is pivoted at the axis of the disc 1, each magnet being placed at a different radius from the axis of the disc 1.

The cores 13 of the recording magnets 6 are held in contact with the surface of the disc 1 by the springs 14. The armature 10 of the magnet 11 is connected to the sector 7 by the link 12 and is normally held against the stop 9 by the spring 15, thereby holding the sector 7 in its normal position.

In operation, a recording magnet 6 is momentarily energized by any suitable means, such as a battery momentarily connected to the winding of said magnet, recording a magnetic signal on disc 1 at the point where the core of said magnet touches said disc. The magnet 4 is then energized by any suitable means, drawing back pawl 2 to engage a new tooth of the disc 1. Said magnet is then deenergized and the spring 5 through the pawl 2 partly rotates the disc 1. Energizing the recording magnet 6 then records another signal at another point on the disc 1. Signals may thus be recorded around a circular path on the disc 1 by the recording magnet 6, each signal being recorded while said disc is stationary. Similar signals may be similarly recorded at the same time in other circular paths on said disc by the other recording magnets 6.

For reproduction of the signals, the magnet 11 is energized, attracting its armature 10 which partly rotates the sector 7. The movement of the armature 10 is such that the angle through which the sector 7 moves is approximately one-half the angle between adjacent teeth of disc 1. When magnet 4 is now repeatedly energized and deenergized, the cores of the recording magnets are, at each step of disc 1, between the positions where signals are recorded thereon. As the magnet 4 now rotates the disc 1 in steps, the recorded signals pass the cores of the recording magnets at speed, inducing in the windings of said magnets voltages indicative of said signals which may be detected by well-known means, such as a galvanometer or other suitable indicating device.

Recording magnets may be similarly arranged on an extension of the sector 7 to record and reproduce signals on the opposite side of the disc 1. Erasing magnets may also be mounted adjacent to each of the recording magnets and suitably energized to erase the signals after they have been reproduced. In the present embodiment of the invention, the magnetic medium is in the form of a disc. It is obvious, however, that it may be made in the form of a drum or in other form. Other modifications and equivalents which may be employed will be apparent to those skilled in the art.

The terms and expressions which I have employed in reference to my invention and its elements are used as terms of description and not of limitation and I have no intention in the use of such terms and expressions of excluding equivalents of the features shown and described or portions thereof, but, on the contrary, intend to include therein any and all equivalents and modifications which may be employed without departing from the spirit of the invention.

What is claimed is:

1. A magnetic recorder and reproducer comprising in combination a movable magnetic medium, means for moving said medium in steps, means including a magnet for recording magnetic signals on said medium at each step thereof while said medium is stationary, and means including said magnet for reproducing said signals at each step of said medium while said medium is moving.

2. A magnetic recorder and reproducer comprising in combination a rotatable magnetic medium having a circular array of teeth thereon, means engaging said teeth for rotating said medium in steps, means including a magnet for recording magnetic signals on said medium at each step thereof while said medium is stationary, means for displacing said magnet relative to said medium for reproduction of said signals, and means including said magnet as displaced for reproducing said signals at each step of said medium while said medium is rotating.

3. A magnetic recorder and reproducer comprising in combination a magnetic medium in the form of a disc having teeth around the periphery thereof, a pawl engaging said teeth, means for actuating said pawl to rotate said disc in steps, means including a magnet for recording signals on said medium at each step thereof while said medium is stationary, means for angularly displacing said magnet relative to said disc for reproduction of said signals, and means including said magnet as displaced for reproducing said signals at each step of said disc while said disc is rotating.

4. In a magnetic recorder, the combination of a magnetic medium having teeth thereon, a pawl engaging said teeth, means including a magnet for recording signals on said medium, and means for actuating said pawl to move said medium relative to said magnet.

5. A magnetic recorder comprising in combination a magnetic medium in the form of a disc of magnetizable material having teeth around the periphery thereof, a pawl engaging said teeth, means for actuating said pawl to rotate said disc in steps, and means for recording a magnetic signal on said disc at each step thereof.

6. A magnetic recorder and reproducer comprising in combination a magnetic medium, means for advancing said medium in steps, a recording and reproducing magnet positioned for recording signals on said medium at each step thereof, and means for displacing said magnet relative to said medium whereby at each step of said medium said magnet is positioned between two of the signal-recording positions on said medium.

7. A magnetic recorder and reproducer comprising in combination a rotatable magnetic medium in the form of a disc of magnetizable material having teeth around the periphery thereof, a pawl engaging said teeth, means for actuating said pawl to rotate said disc in steps, a recording and reproducing magnet positioned for recording magnetic signals on said disc at each step thereof and means for angularly displacing said magnet relative to said disc whereby at each step of said disc said magnet is positioned between two of the signal-recording positions on said disc.

RUDOLPH F. MALLINA.

REFERENCES CITED

The following references are of record in the file of this patent:

UNITED STATES PATENTS

| Number | Name | Date |
|---|---|---|
| 2,080,100 | Tauschek | May 11, 1937 |
| 2,307,965 | Shepherd | Jan. 12, 1943 |